US011100627B2

(12) United States Patent
He

(10) Patent No.: US 11,100,627 B2
(45) Date of Patent: Aug. 24, 2021

(54) DETECTING METHOD AND DEVICE FOR DISPLAY PANEL

(71) Applicant: HKC CORPORATION LIMITED, Guangdong (CN)

(72) Inventor: Huailiang He, Chongqing (CN)

(73) Assignee: HKC Corporation Limited, Shenzhen (CN)

( * ) Notice: Subject to any disclaimer, the term of this patent is extended or adjusted under 35 U.S.C. 154(b) by 44 days.

(21) Appl. No.: 16/643,139

(22) PCT Filed: Dec. 13, 2017

(86) PCT No.: PCT/CN2017/115898
§ 371 (c)(1),
(2) Date: Feb. 28, 2020

(87) PCT Pub. No.: WO2019/041634
PCT Pub. Date: Mar. 7, 2019

(65) Prior Publication Data
US 2020/0258211 A1    Aug. 13, 2020

(30) Foreign Application Priority Data

Aug. 29, 2017 (CN) .......................... 201710754690.3

(51) Int. Cl.
*G06T 7/00* (2017.01)
(52) U.S. Cl.
CPC .. *G06T 7/0004* (2013.01); *G06T 2207/30121* (2013.01)

(58) Field of Classification Search
CPC ......... G06T 7/0004; G06T 2207/30121; G02F 1/1303; G02F 2201/58; G02F 2203/30;
(Continued)

(56) References Cited

U.S. PATENT DOCUMENTS 7,271,791 B2 * 9/2007 Yamazaki ............ G09G 3/2092
345/690
7,889,188 B2 * 2/2011 Hwang .................. G09G 3/006
345/204
(Continued)

FOREIGN PATENT DOCUMENTS

CN    102803940 A    11/2012
CN    103760165 A    4/2014
(Continued)

*Primary Examiner* — Sheela C Chawan
(74) *Attorney, Agent, or Firm* — Muncy, Geissler, Olds & Lowe, P.C.

(57) ABSTRACT

A detecting method and a detecting device for a display panel are provided. The detecting method includes: collecting a first detection image of the display panel, and acquiring a gray scale value of each of pixel elements in the first detection image; determining the pixel element of the first detection image having the gray scale value outside a default gray scale range as a first pixel element, determining a first communication region constituted by each of the first pixel element of the first detection image, and calculating an aspect ratio of the first communication region; and looking up a target parameter matching with the aspect ratio of the first communication region from a pre-built database, and determining a target type corresponding to the target parameter as a type of the display panel.

19 Claims, 6 Drawing Sheets

(58) Field of Classification Search
CPC .. G02F 1/1309; G09G 2330/10; G09G 3/006; G09G 3/3611; G01N 21/95; G01N 2021/9513
USPC ....... 382/100, 128, 132, 149, 181, 190, 195, 382/199, 254, 266, 232, 237, 205, 173, 382/176, 276, 293, 298, 131; 345/418, 345/581, 589, 89, 30, 55, 84, 87; 348/25, 348/28
See application file for complete search history.

(56) References Cited

U.S. PATENT DOCUMENTS

| | | | | |
|---|---|---|---|---|
| 8,179,424 | B2* | 5/2012 | Moller | H04N 13/363 |
| | | | | 348/46 |
| 2008/0297455 | A1* | 12/2008 | Endo | G09G 3/2022 |
| | | | | 345/87 |
| 2008/0303758 | A1* | 12/2008 | Ooishi | G09G 5/399 |
| | | | | 345/84 |
| 2010/0110058 | A1* | 5/2010 | Moh | G09G 3/3655 |
| | | | | 345/211 |
| 2012/0112991 | A1* | 5/2012 | Hashimoto | G09G 3/3413 |
| | | | | 345/89 |
| 2014/0198202 | A1* | 7/2014 | Kim | G09G 3/006 |
| | | | | 348/125 |

FOREIGN PATENT DOCUMENTS

| | | |
|---|---|---|
| CN | 104614878 A | 5/2015 |
| CN | 105845062 A | 8/2016 |
| JP | 20073334262 A | 12/2007 |

* cited by examiner

DETECTING METHOD AND DEVICE FOR DISPLAY PANEL

BACKGROUND

Technical Field

The embodiment of this disclosure relates to the technology of detecting a display panel, and more particularly to a detecting method and a detecting device for a display panel.

Related Art

In the manufacturing process of the existing display panel, various detections need to be implemented to confirm that the display panel being manufactured has no defect to prevent the bad product from flowing to the back end for continuous processing, and to prevent a lot of the consumable materials and the production time of the module from being wasted. The various detections of the existing display panel include a data test, a visual detection, a whole test, a final test and the like.

The visual detection is the light-on detection, and mainly performs the display detection on the formed panel. The processes of the existing light-on detection includes: automatically photographing the formed panel placed on the light-on machine; and then determining whether the formed panel has the defect according to the photographed photo, and determining the defect type of the formed panel by the worker.

Obviously, the existing light-on detection of the display panel needs the worker to determine whether the formed panel has the defect and the defect type, so the manpower cost is high and the efficiency is low.

SUMMARY

This disclosure provides a detecting method and a detecting device for a display panel to decrease the manpower cost for the light-on detection and increase the detecting efficiency.

The disclosure provides a detecting method for a display panel, comprising: collecting a first detection image of the display panel, and acquiring a gray scale value of each of pixel elements in the first detection image; determining the pixel element of the first detection image having the gray scale value outside a default gray scale range as a first pixel element, determining a first communication region constituted by each of the first pixel element of the first detection image, and calculating an aspect ratio of the first communication region; and looking up a target parameter matching with the aspect ratio of the first communication region from a pre-built database, and determining a target type corresponding to the target parameter as a type of the display panel.

Further, a process of pre-setting the default gray scale range of the detecting device comprises: collecting second detection images of a plurality of normal display panels, and acquiring a gray scale value of each of pixel elements of the second detection images; and determining the gray scale range constituted by a maximum gray scale value and a minimum gray scale value of the pixel elements of the second detection images as the default gray scale range.

Further, a process of building the database comprises: collecting third detection images of at least 25 display panels having a first type, and acquiring a gray scale value of each of pixel elements of each of the third detection images; looking up third pixel elements of the third detection images having the gray scale values outside the default gray scale range, and determining a third communication region constituted by each of the third pixel elements of the third detection images; and calculating an aspect ratio of the third communication region in each of the third detection images, determining a parameter range constituted by a maximum aspect ratio and a minimum aspect ratio of the third communication regions in the third detection images, and determining the parameter range as a first parameter corresponding to a first type.

Further, the database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

Further, a number of the first pixel elements occupying the ratio exceeding 80%.

Further, an aspect ratio of the first communication region is a ratio of a maximum number of the pixel elements of the first communication region in a horizontal direction to a maximum number of the pixel elements of the first communication region in a vertical direction.

Further, a long side direction of the display panel is corresponding to the vertical direction, and a short side direction of the display panel is corresponding to the horizontal direction.

Further, a long side direction of the display panel is corresponding to the horizontal direction, and a short side direction of the display panel is corresponding to the vertical direction.

Further, the step of collecting the second detection images of the plurality of normal display panels is to collect the second detection images of at least 25 display panels.

The disclosure also provides a detecting device for a display panel including an image collecting module, a pixel determining module and a type looking module. The image collecting module collects a first detection image of the display panel, and acquires a gray scale value of each of pixel elements in the first detection image. The pixel determining module determines the pixel element of the first detection image having the gray scale value outside a default gray scale range as a first pixel element, determines a first communication region constituted by each of the first pixel elements of the first detection images, and calculates an aspect ratio of the first communication region. The type looking module looks up a target parameter matching with the aspect ratio of the first communication region from a pre-built database, and determines a target type corresponding to the target parameter as a type of the display panel.

Further, the database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

Further, an aspect ratio of the first communication region is a ratio of a maximum number of the pixel elements of the first communication region in a horizontal direction to a maximum number of the pixel elements of the first communication region in a vertical direction.

Further, the detecting device further comprises a gray scale presetting module. Before the first detection image of the display panel is collected, the gray scale presetting module collects second detection images of a plurality of normal display panels and acquires the gray scale value of each of pixel elements of the second detection images, and determines a gray scale range, constituted by a maximum gray scale value and a minimum gray scale value of the pixel elements of the second detection images, as the default gray scale range.

Further, the detecting device further comprises a database building module. Before the first detection image of the display panel is collected, the database building module collects third detection images of at least 25 display panels having the first type and acquires a gray scale value of each of pixel elements of each of the third detection images, looks up the third pixel elements of the third detection images having the gray scale values outside the default gray scale range, determines the third communication region constituted by each of the third pixel elements of the third detection images, calculates the aspect ratio of the third communication region in each of the third detection images, and determines the parameter range, constituted by a maximum aspect ratio and a minimum aspect ratio of the third communication regions in the third detection images, as the first parameter corresponding to the first type.

Further, the gray scale presetting module and the database building module are integrated into a configuration module.

The disclosure further provides a detecting device for a display panel including an image collecting module, a pixel determining module and a type looking module. The image collecting module collects a first detection image of the display panel, and acquires a gray scale value of each of pixel elements in the first detection image. The pixel determining module determines the pixel element of the first detection image having the gray scale value outside a default gray scale range as a first pixel element, determines a first communication region constituted by each of the first pixel elements of the first detection images, and calculates an aspect ratio of the first communication region. An aspect ratio of the first communication region is a ratio of a maximum number of the pixel elements of the first communication region in a horizontal direction to a maximum number of the pixel elements of the first communication region in a vertical direction. The type looking module looks up a target parameter matching with the aspect ratio of the first communication region from a pre-built database, and determines a target type corresponding to the target parameter as a type of the display panel. The database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

The detecting method and detecting device for a display panel of this disclosure can automatically collect a first detection image of the display panel, acquire a gray scale value of each of pixel elements in the first detection image, rapidly determine the first pixel elements of the first detection image having the gray scale values outside default gray scale range and the first communication region constituted by the first pixel elements, calculate an aspect ratio of the first communication region, look up a target parameter matching with the aspect ratio of the first communication region from the database, and determine a target type corresponding to the target parameter as the type of the display panel. This disclosure implements the fully automatic detection on the type of the display panel. The detecting device can automatically detect and determine the type of the display panel without wasting the manpower, thereby decreasing the manpower cost. In addition, the fully automatic detection process of the detecting device has the high speed, and can effectively enhance the detecting efficiency.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
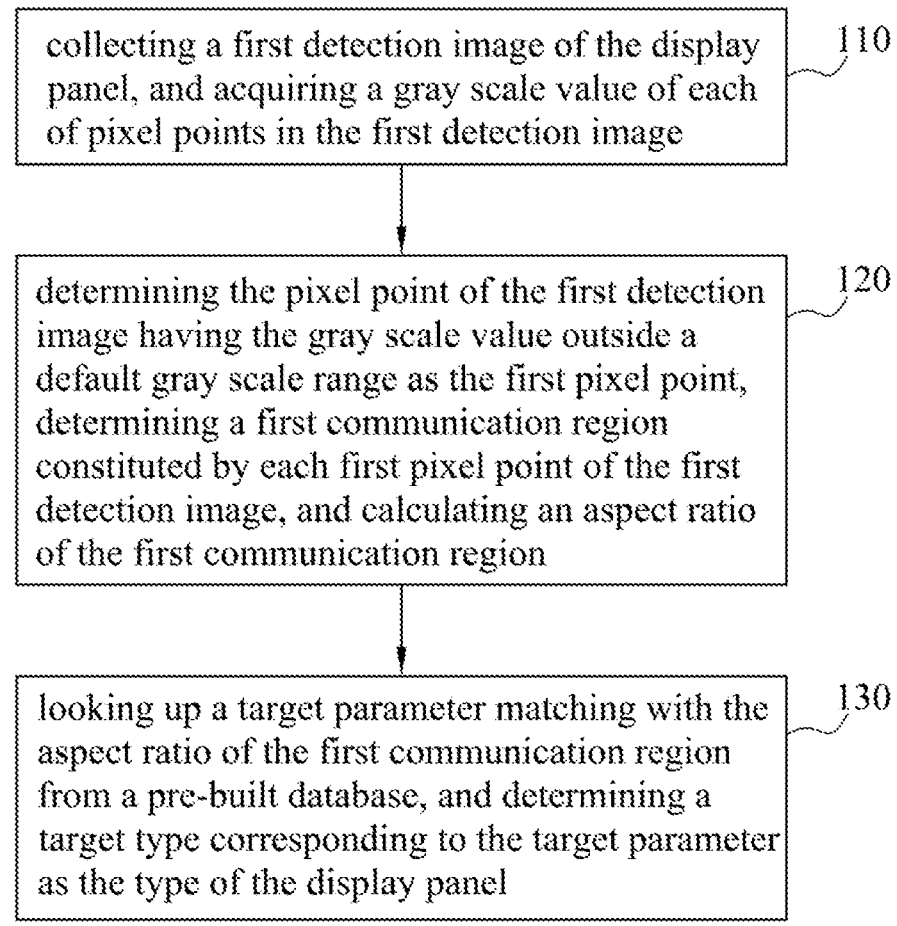
FIG. 1 is a flow chart showing a detecting method for a display panel provided by the embodiment of this disclosure.

FIG. 1 is a flow chart showing a detecting method for a display panel provided by the embodiment of this disclosure. Referring to FIG. 1, the technical solution of this embodiment is applicable to the condition of detecting the type of the display panel. The method may be performed by the detecting device for detecting the display panel, and the device may be implemented by way of software and/or hardware and configured in and executed by the detection apparatus.

The detecting method for the display panel according to this embodiment specifically includes the following steps.

In a step 110, a first detection image of the display panel is collected, and a gray scale value of each of pixel elements in the first detection image is acquired.

The display panel of this embodiment is a formed panel. Taking the liquid crystal display as an example, the to-be-detected display panel is a formed liquid crystal box without other structures including a backlight module and the like. The display panel of this embodiment represents the display panel lighted by the detection apparatus. Specifically, after the detection apparatus has detected that the display panel enters, the display test signal is inputted to the display panel by way of short-circuiting stick detecting so that the light of the backlight module enters the display panel to light on the display panel. The detection apparatus is integrated with a photographing module, and the detecting device adopts the photographing module to collect a first detection image of the display panel and acquire a gray scale value of each of pixel elements in the first detection image.

It will be appreciated that the methods of the detection apparatus of lighting on the display panel in this disclosure include, for example but without limitation to, the short-circuiting stick detection method, and any existing applicable light-on detecting method. In this disclosure, the detecting device acquires the gray scale value of each of the pixel elements in the first detection image by any existing applicable image processing method, and no specific description and restriction will be made in this disclosure.

In a step 120, the pixel element of the first detection image having the gray scale value outside a default gray scale range is determined as the first pixel element, a first communication region constituted by each first pixel element of the first detection image is determined, and an aspect ratio of the first communication region is calculated.

In this embodiment, the detecting device is stored with the default gray scale range, which is the gray scale range, to which each pixel element in the normal display panel pertains when the type is detected. Obviously, when the type is detected, the gray scale value of the to-be-detected display panel in the default gray scale range is the normal gray scale value, the pixel element corresponding to the normal gray scale value is the normal pixel element, the gray scale value of the to-be-detected display panel outside the default gray scale range is the abnormal gray scale value, and the pixel element corresponding to the abnormal gray scale value is the abnormal pixel element (i.e., the first pixel element). In this embodiment, the detecting device can find each first pixel element of the first detection image by way of looking up according to the gray scale value of each of the pixel elements in the first detection image and the default gray scale range.

In this embodiment, the detecting device can determine at least one first communication region according to each of the first pixel elements of the first detection image. Because some discrete first pixel elements may present in the display panel, in order to facilitate the subsequent type distinguishing, it is possible to select, from the first communication region, the number of the first pixel elements occupying the ratio exceeding 80%. As shown in the first detection image of FIG. 2, for example, the default gray scale range is [49, 51], wherein the pixel element having the gray scale value is 49, 50 or 51 is the normal pixel element, and the pixel element having the gray scale value of 35 outside the default gray scale range is the first pixel element. Obviously, a first communication region S1 is formed in the first detection image, and the number of the first pixel elements in the first communication region S1 occupies the ratio exceeding 80%.

Figure 2:
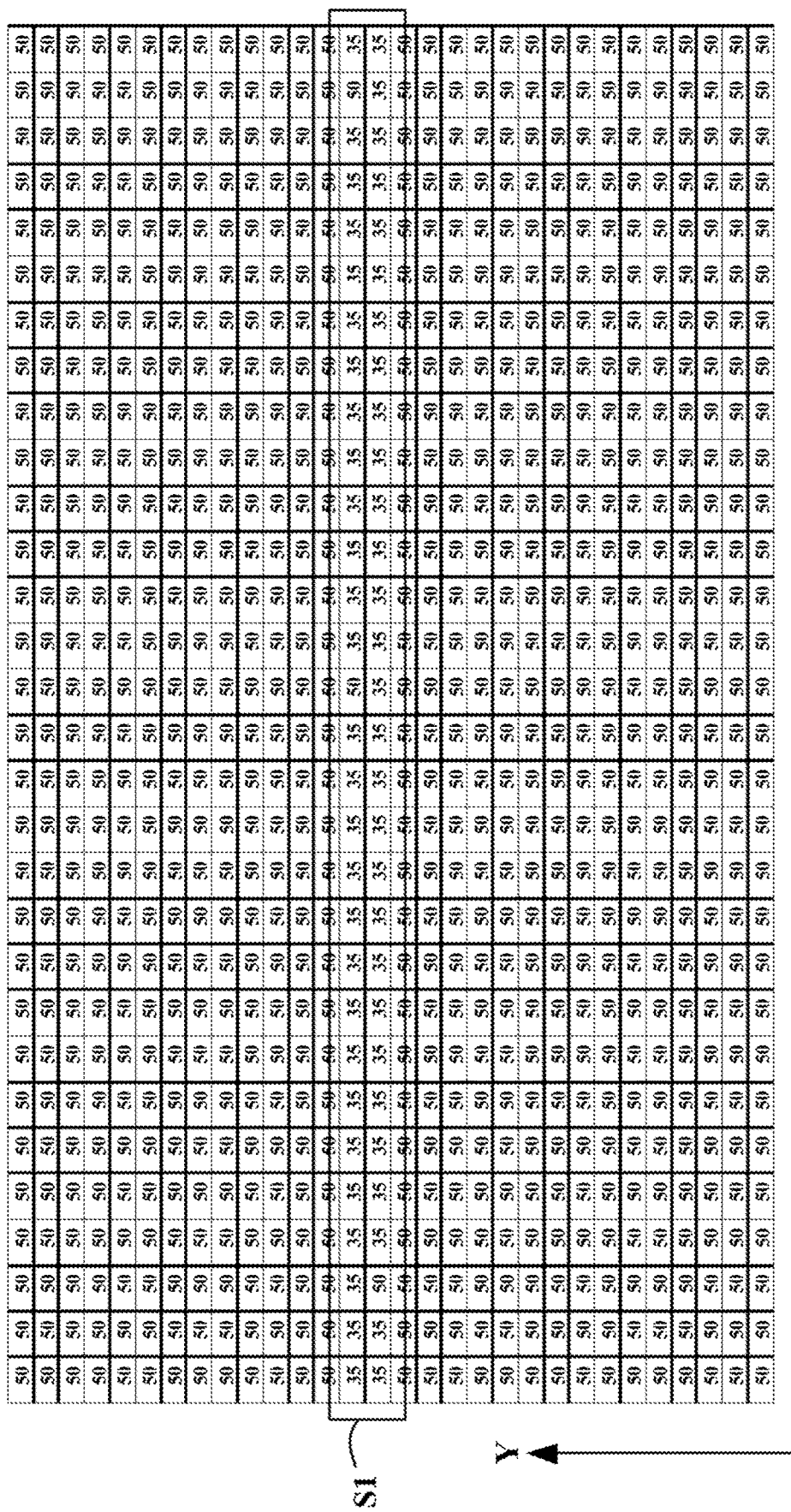
FIG. 2 is a schematic view showing the first detection image of the to-be-detected display panel provided by the embodiment of this disclosure.

In this embodiment, after determining the first communication region of the first detection image, the detecting device can calculate an aspect ratio of the first communication region. Herein, an aspect ratio of the first communication region may be selected as the ratio of the maximum number of the pixel elements of the first communication region in the horizontal direction (X) to the maximum number of the pixel elements of the first communication region in the vertical direction (Y). As shown in FIG. 2, the maximum number of the pixel elements of the first communication region S1 in the X direction is 30, the maximum number of the pixel elements in the Y direction is 2, and the aspect ratio of the first communication region S1 15. It is to be described that the horizontal direction may be selected as the long side direction of the display panel, and the vertical direction may be selected as the short side direction of the display panel. Obviously, for one arbitrary detection apparatus, after the display panel enters the detection apparatus, even if the placement direction of the display panel is changed, the horizontal direction and the vertical direction may also be determined according to the long side direction and the short side direction of the display panel, so that an aspect ratio of the first communication region of the display panel can be thus determined. In the embodiment of this disclosure, it is possible to select to determine the long side direction of the display panel as corresponding to the horizontal direction, and the short side direction of the display panel as corresponding to the vertical direction, and to build the database corresponding the display panel according to the determined corresponding relationship. Based on the database, the detection apparatus detects each display panel, and thus accurately determines the type of each display panel.

In other embodiments of this disclosure, it is also possible to select to determine the long side direction of the display panel as corresponding to the vertical direction, and the short side direction of the display panel as corresponding to the horizontal direction, and to build the database corresponding the display panel according to the determined corresponding relationship. Based on the database, the detection apparatus detects each display panel, and thus accurately determines the type of each display panel.

It will be appreciated that the detecting device in this disclosure can determine an aspect ratio of the first communication region according to the data processing method, and determine the first pixel element and the first communication region according to the image processing method; and related practitioners can set the occupied ratio of the number of the first pixel elements in the first communication region by themselves according to the design requirements, wherein the ratio is not restricted to 80% in this disclosure.

In a step 130, a target parameter matching with the aspect ratio of the first communication region is looked up from a pre-built database, and a target type corresponding to the target parameter is determined as the type of the display panel.

In this embodiment, the detecting device is stored with a database, which contains various types and various parameters corresponding to various types. The parameter may be selected as the aspect ratio range corresponding to the type. In this embodiment, after the detecting device has calculated the aspect ratio of the first communication region of the first detection image, the aspect ratio of the first communication region of the first detection image may match with the database. If the found aspect ratio of the first communication region of the first detection image falls within the aspect ratio range defined by a certain parameter, then the aspect ratio of the first communication region of the first detection image matches with the parameter, the parameter is determined as the target parameter, the target type corresponding to the target parameter is determined as the detected type of the display panel, and the detecting device marks the detected type of the display panel. Thus, the automatic type detection of the display panel is implemented.

For example, the database includes the horizontal stripe type and the parameter [10, 100] of the horizontal stripe type. As shown in FIG. 2, the aspect ratio of the first communication region S1 of the first detection image matches with the horizontal stripe parameter, and the detecting device can mark the detected type of the display panel as the horizontal stripe type.

It is to be described that the worker can determine the malfunction of the production line of the batch of display panels according to the type of the same batch of display panels recorded in the light-on test machine, and the apparatus adjustment of the production line can be performed according to this information to effectively decrease the bad rate of the panels.

The embodiment of this disclosure provides a detecting method for a display panel by automatically collecting a first detection image of the display panel, acquiring a gray scale value of each of pixel elements in the first detection image, rapidly determining the first pixel elements of the first detection image having the gray scale values outside default gray scale range and the first communication region constituted by the first pixel elements, calculating an aspect ratio of the first communication region, and finally looking up a target parameter matching with the aspect ratio of the first communication region from the database, and determining a target type corresponding to the target parameter as the type of the display panel. The embodiment of this disclosure implements the fully automatic detection on the type of the display panel. The detecting device can automatically detect and determine the type of the display panel without wasting the manpower, thereby decreasing the manpower cost. In addition, the fully automatic detection process of the detecting device has the high speed, and can effectively enhance the detecting efficiency.

Exemplarily, on the basis of the above-mentioned embodiment, the operation of each step may be implemented by selecting a plurality of processing methods. The preferred implementation methods will be described in detail in the following.

Figure 3:
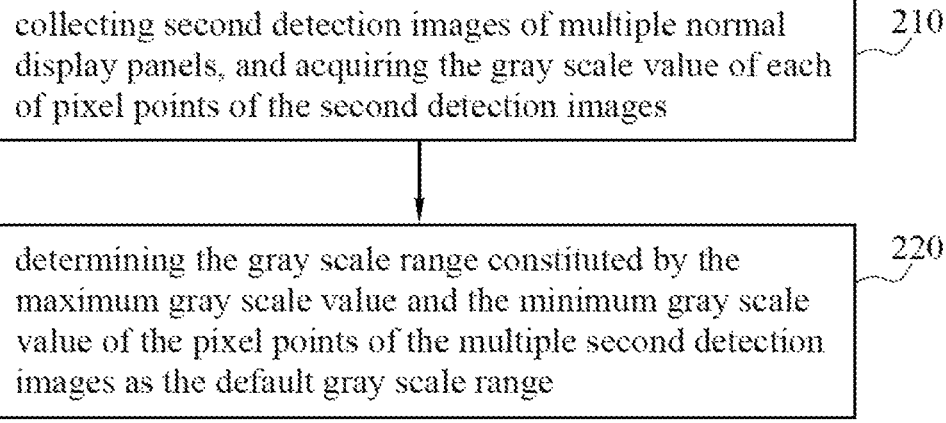
FIG. 3 is a schematic flow chart showing the default gray scale range of the detecting device provided by the embodiment of this disclosure.

Optionally, as shown in FIG. 3, the process of pre-setting the default gray scale range of the detecting device includes the following steps.

In a step 210, second detection images of a plurality of normal display panels are collected, and the gray scale value of each of pixel elements of the second detection images are acquired.

In this embodiment, the normal display panel is determined by the worker to have no defect in the light-on detection. That is, the gray scale value of each of pixel elements thereof is normal. In order to enhance the accuracy of the default gray scale range, the second detection images of at least 25 defect-free display panel can be collected, and the gray scale value of each of pixel elements of the second detection images can be acquired. The processes of collecting the detection images of the defect-free display panels and the gray scale value of each of pixel elements of the image are similar to the processes of the step 110 of collecting the first detection image and the gray scale value of each of the pixel elements in the first detection image, and detailed descriptions thereof will be omitted herein.

The number of the selected normal display panels may be determined according to different product applications and requirements. For example, the collected number of the normal display panels may also be 20 or 100, and no specific description and restriction will be made in this disclosure.

In a step 220, the gray scale range constituted by the maximum gray scale value and the minimum gray scale value of the pixel elements of the a plurality of second detection images are determined as the default gray scale range.

In this embodiment, after the gray scale value of each of pixel elements of the second detection images is acquired, the maximum gray scale value and the minimum gray scale value of the a plurality of second detection images are found by way of looking up, the gray scale range constituted by the maximum gray scale value and the minimum gray scale value is the default gray scale range. For example, in the a plurality of second detection images, the maximum gray scale value of the pixel element is 52, the minimum gray scale value is 48, and the default gray scale range is [48, 52]. Upon the light-on detection, the pixel elements of the image of the to-be-detected display panel having the gray scale values outside the default gray scale range are the first pixel elements.

Figure 4:
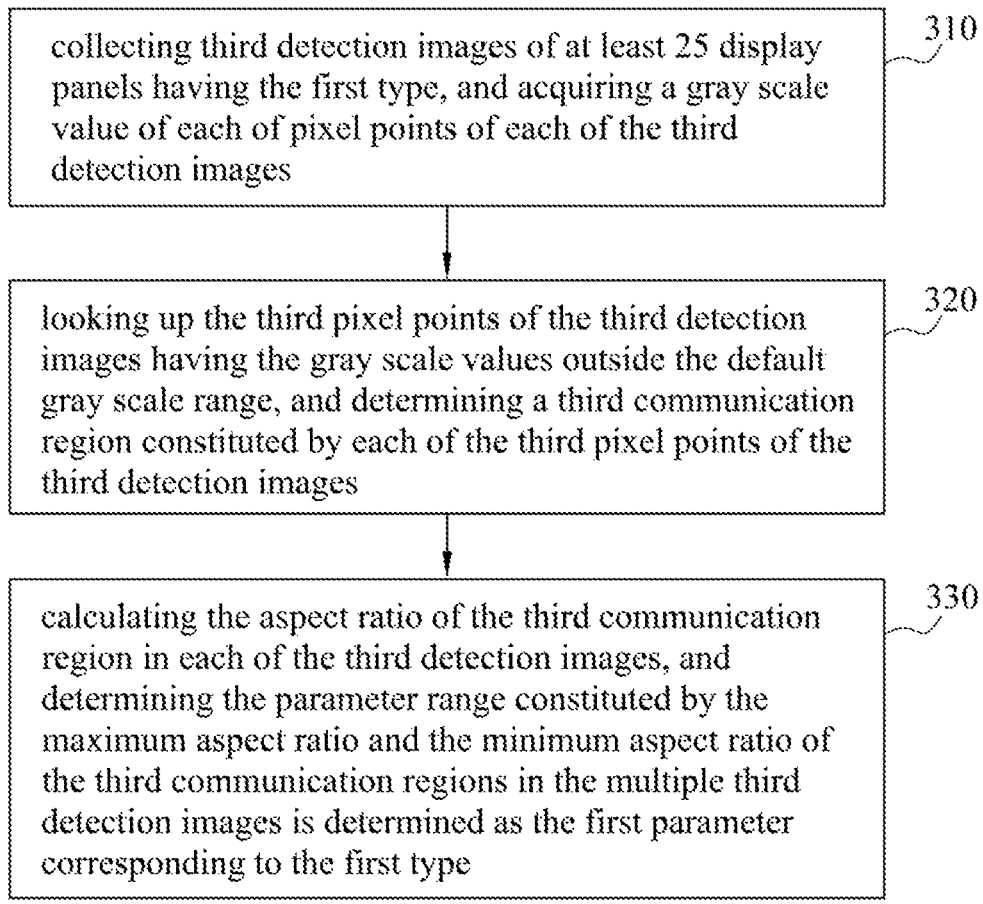
FIG. 4 is a schematic flow chart showing the detecting device building the database according to the embodiment of this disclosure.

Optionally, referring to FIG. 4, the database building process in the detecting device includes the following steps.

In a step 310, third detection images of at least 25 display panels having the first type are collected, and a gray scale value of each of pixel elements of each of the third detection images is acquired.

In this embodiment, the first type of display panels pertains to the same type of display panels determined by the worker in the light-on detection. For example, the first type is the horizontal stripe type. In order to enhance the accuracy of the horizontal stripe parameter, the third detection images of at least 25 display panels with the horizontal stripe type may be collected and the gray scale value of each of pixel elements of the third detection image is acquired. The processes of collecting the detection images with the first type of display panels and the gray scale value of the each of pixel elements of the image are similar to the step 110, so the detailed description thereof is omitted.

The collected number of the first type of display panels may also be 20 or 100, and no specific description and restriction will be made in this disclosure.

In a step 320, the third pixel elements of the third detection images having the gray scale values outside the default gray scale range are looked up, and a third communication region constituted by each of the third pixel elements of the third detection images is determined.

In a step 330, the aspect ratio of the third communication region in each of the third detection images is calculated, the parameter range constituted by the maximum aspect ratio and the minimum aspect ratio of the third communication regions in the a plurality of third detection images is determined, and the parameter range is determined as the first parameter corresponding to the first type.

In this embodiment, the processes of determining the third pixel elements of the third detection images, the third communication region and the aspect ratio of the third communication region are similar to the processes of determining the first pixel element of the first detection image, the first communication region and the aspect ratio of the first communication region in the step 120, so the detailed description thereof is omitted.

In this embodiment, after the aspect ratio of each of the third communication region in the a plurality of third detection images is acquired, the maximum aspect ratio and the minimum aspect ratio are looked up from the a plurality of third detection images, and the aspect ratio range constituted by the maximum aspect ratio and the minimum aspect ratio is the first parameter corresponding to the first type.

For example, the first type is set as the horizontal stripe type, the third detection images of at least 25 display panels having the first type are collected, the maximum aspect ratio of the third communication region in the a plurality of third detection images is 100, the minimum aspect ratio thereof is 10, and the horizontal stripe parameter is [10, 100]. Upon the light-on detection, if the aspect ratio of the first communication region of the to-be-detected display panel is 20, then the detected type of the display panel is determined as the horizontal stripe type. Taking each display panel including 50 rows*200 columns of pixel elements as an example, the row direction is the X direction (i.e., the horizontal direction), the column direction is the Y direction (i.e., the vertical direction), 200 columns are successively marked as R1 to R200, and 50 rows are successively marked as L1 to L50. That is, the number of pixel elements in the horizontal (X) direction is 200, and the number of pixel elements in the vertical (Y) direction is 50.

Figure 5A:
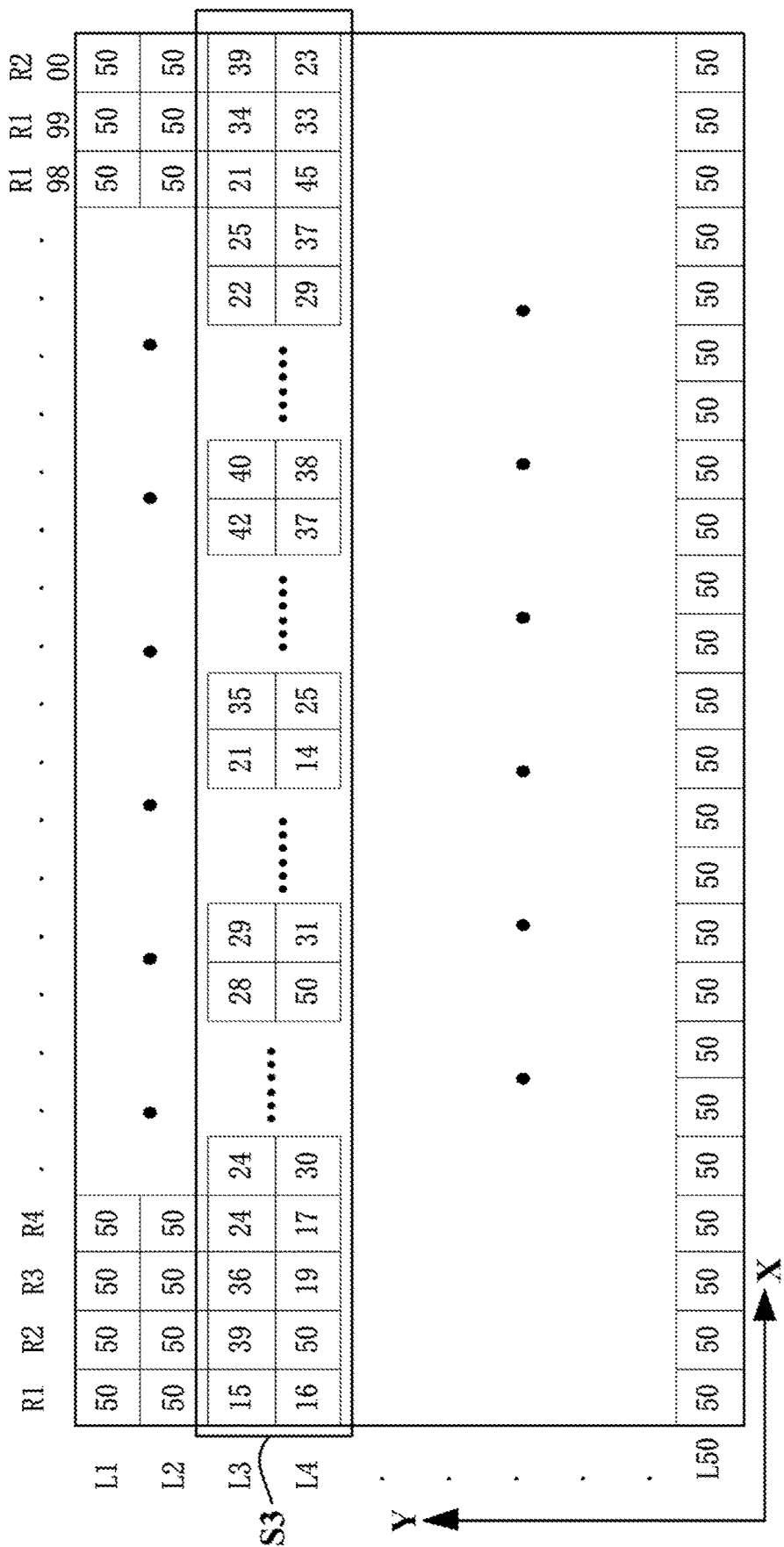
FIG. 5A shows the third detection image of the display panel having the maximum aspect ratio.

FIG. 5A shows the third detection image of the display panel having the maximum aspect ratio. In the third communication region S3 of the display panel, the number of the third pixel elements having the gray scale values outside the default gray scale range (e.g., [48, 52]) in the horizontal (X) direction is 200, the number of the third pixel elements having the gray scale values outside default gray scale range (e.g., [48, 52]) in the vertical (Y) direction is 2, then the aspect ratio of the third communication region S3 of the display panel is 100.

Figure 5B:
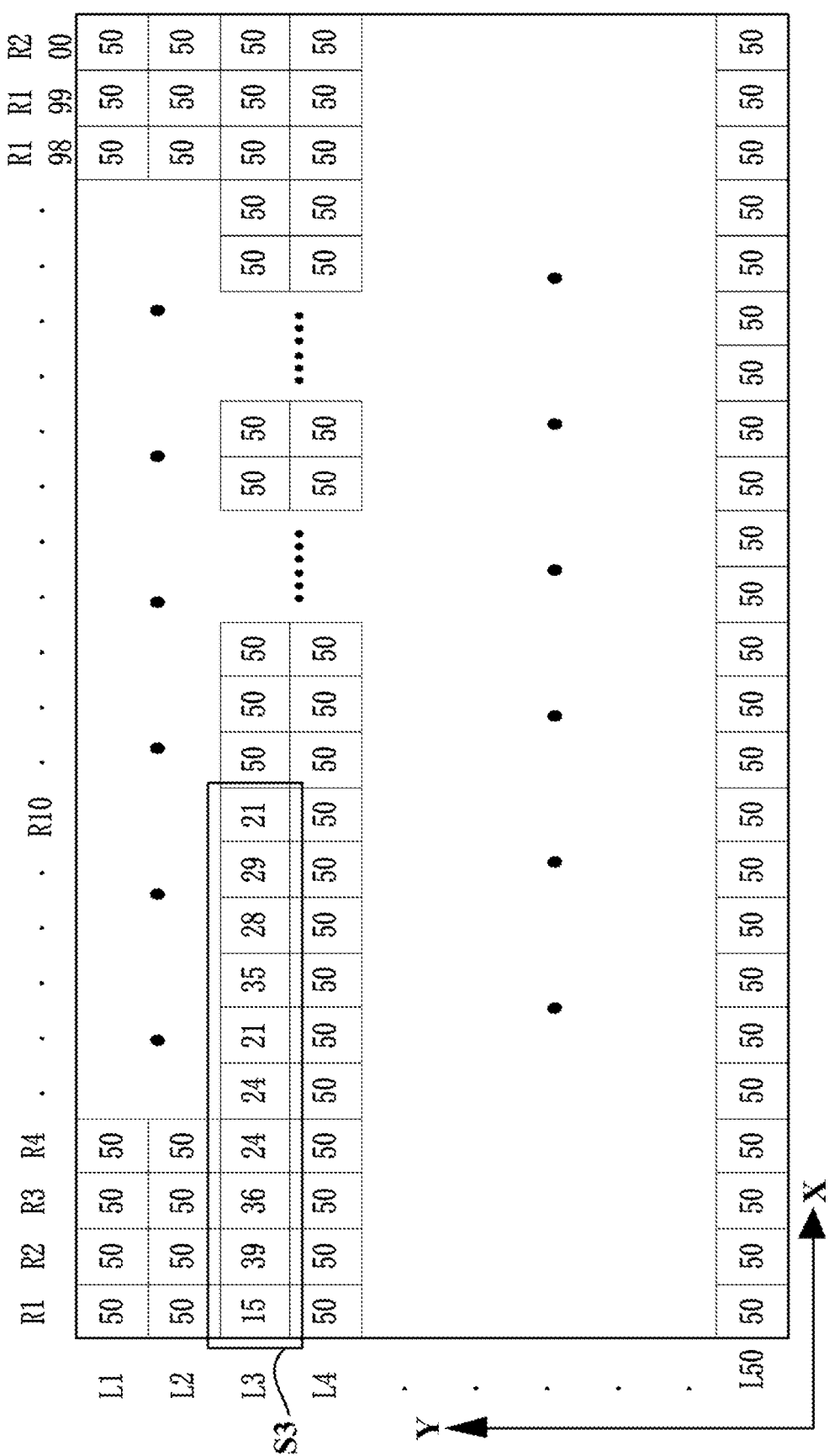
FIG. 5B shows the third detection image of the display panel having the minimum aspect ratio.

FIG. 5B shows the third detection image of the display panel having the minimum aspect ratio. In the third communication region S3 of the display panel, the number of the third pixel elements having the gray scale values outside the default gray scale range (e.g., [48, 52]) in the horizontal (X) direction is 10, the number of the third pixel elements having the gray scale values outside default gray scale range (e.g., [48, 52]) in the vertical (Y) direction is 1, then the aspect ratio of the third communication region S3 of the display panel is 10.

Other types of parameters are acquired according to the above-mentioned method, and the database is thus built. The type of the display panel arbitrarily including 50 rows*200 columns of pixel elements can be detected according to the database.

Optionally, the database includes the horizontal stripe type and the horizontal stripe parameter corresponding to the horizontal stripe type, the vertical stripe type and the vertical stripe parameter corresponding to the vertical stripe type, the rhombus type and the rhombus parameter corresponding to the rhombus type, and the circular type and the circular parameter corresponding to the circular type. The horizontal stripe, vertical stripe, rhombus and circular types are the conventional defect patterns of the display panel, but the types and the parameters in the database are not limited to only the above-mentioned examples. In addition, the defects of different display panels have the greater differences in the patterns, shapes and sizes, and the parameters of the defect patterns of the horizontal stripe, vertical stripe, circular and rhombus type are not specifically illustrated.

Figure 6:
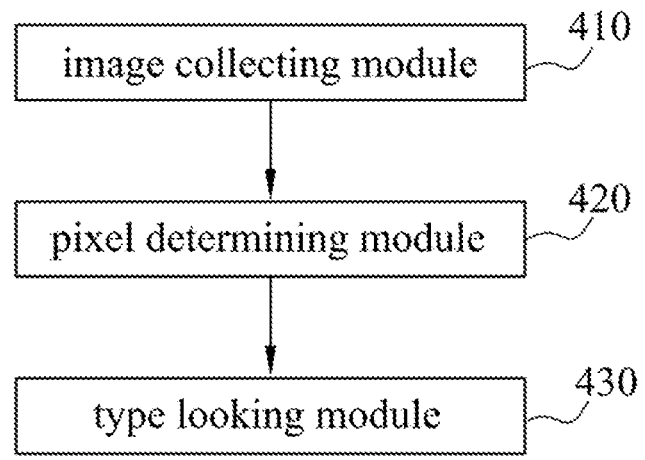
FIG. 6 is a schematic view showing the detecting device for the display panel provided by the embodiment of this disclosure.

FIG. 6 is a schematic view showing the detecting device for the display panel provided by the embodiment of this disclosure. The technical solution of this embodiment is applicable to the condition of detecting the type of the display panel. The method may be performed by the detecting device for detecting the display panel, and the device may be implemented by way of software and/or hardware and configured in and executed by the detection apparatus.

The detecting device for the display panel provided by this embodiment includes an image collecting module 410, a pixel determining module 420 and a type looking module 430.

The image collecting module 410 collects a first detection image of the display panel, and acquires a gray scale value of each of pixel elements in the first detection image. The pixel determining module 420 determines the pixel element of the first detection image having the gray scale value outside a default gray scale range as the first pixel element, determines a first communication region constituted by each first pixel element of the first detection image, and calculates an aspect ratio of the first communication region. The type looking module 430 looks up a target parameter matching with the aspect ratio of the first communication region from the pre-built database, and determines a target type corresponding to the target parameter as the type of the display panel.

Optionally, the detecting device further includes a gray scale presetting module. Before the first detection image of the display panel is collected, the gray scale presetting module collects second detection images of a plurality of normal display panels and acquires the gray scale value of each of pixel elements of the second detection images, and determines the gray scale range, constituted by the maximum gray scale value and the minimum gray scale value of the pixel elements of the a plurality of second detection images, as the default gray scale range.

Optionally, the detecting device further includes a database building module. Before the first detection image of the display panel is collected, the database building module collects third detection images of at least 25 display panels having the first type and acquires a gray scale value of each of pixel elements of each of the third detection images, looks up the third pixel elements of the third detection images having the gray scale values outside the default gray scale range, and determines the third communication region constituted by each of the third pixel elements of the third detection images, calculates the aspect ratio of the third communication region in each of the third detection images, and determines the parameter range, constituted by the maximum aspect ratio and the minimum aspect ratio of the third communication regions in the a plurality of third detection images, as the first parameter corresponding to the first type.

Figure 7:
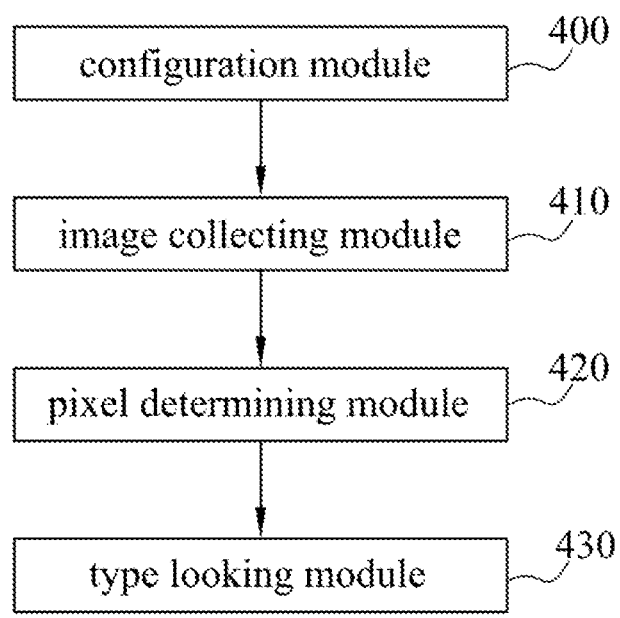
FIG. 7 is a schematic view showing the detecting device for the display panel provided by the embodiment of this disclosure.

It is to be described that the default gray scale range parameter may be stored in the database. As shown in FIG. 7, the detecting device further includes a configuration module 400 integrated with the functions of the gray scale presetting module and the database building module. That is, the gray scale presetting module and the database building module are replaced by the configuration module 400.

Optionally, the database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

Optionally, a number of the first pixel elements occupying the ratio exceeding 80%. Optionally, an aspect ratio of the first communication region is a ratio of a maximum number of the pixel elements of the first communication region in a horizontal direction to a maximum number of the pixel elements of the first communication region in a vertical direction.

In the embodiment of this disclosure, the detecting device needs to collect photos of various defect patterns occurred in the factory after a period of time, and generates the database (defect database) by way of software calculation, and then the detecting device can automatically determine the type of the display panel (defect code), thereby implementing the full automation of detecting the type of the display panel. In the embodiment of this disclosure, the detecting device can automatically detect and determine the type of the display panel without wasting the manpower, thereby decreasing the manpower cost. In addition, the fully automatic detection process of the detecting device has the high speed, and can effectively enhance the detecting efficiency.

The display panel can be, for example, a liquid crystal display panel, an OLED display panel, a QLED display panel, a curved display panel, or any other display panel.

When the display panel is the liquid crystal display panel, the liquid crystal display panel may be a TN liquid crystal panel, an IPS liquid crystal panel, a VA liquid crystal panel, a CPA liquid crystal panel, a PLS liquid crystal panel, an MVA liquid crystal panel or the like. Those skilled in the art will be appreciated that the detecting device for the display panel provided by the embodiment of this disclosure is applicable to the detections of various display panels, and is not restricted to the above-mentioned liquid crystal display panels.

The embodiment of this disclosure further provides a detecting device for the display panel. The detecting device includes an image collecting module, a pixel determining module and a type looking module.

The image collecting module collects a first detection image of the display panel, and acquires a gray scale value of each of pixel elements in the first detection image. The pixel determining module determines the pixel element of the first detection image having the gray scale value outside a default gray scale range as a first pixel element, determines a first communication region constituted by each first pixel element of the first detection image, and calculates an aspect ratio of the first communication region is calculated. The aspect ratio of the first communication region is the ratio of the maximum number of the pixel elements of the first communication region in the horizontal direction to the maximum number of the pixel elements of the first communication region in the vertical direction. The type looking module looks up a target parameter matching with the aspect ratio of the first communication region from the pre-built database, and determines a target type corresponding to the target parameter as the type of the display panel. The database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

This disclosure implements the fully automatic detection on the type of the display panel. The detecting device can automatically detect and determine the type of the display panel without wasting the manpower, thereby decreasing the manpower cost. In addition, the fully automatic detection process of the detecting device has the high speed, and can effectively enhance the detecting efficiency.

The embodiment of this disclosure further provides a detection apparatus, which includes the detecting device of any one of the embodiments. The detection apparatus detects the display panel through the detecting device. Optionally, the detection apparatus further includes a backlight device providing a light source to the display panel, and a signal input device providing a display test signal to the display panel.

It is to be described that the detection apparatus may be selected as a light-on test machine, which differs from the existing light-on machine in that the integrated detecting device in the light-on test machine can automatically implement the light-on detection on the display panel without using the manpower to judge whether the formed panel has the defect and the type of the defect, thereby decreasing the manpower cost and enhancing the detecting efficiency.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A detecting method for a display panel, comprising:
   collecting a first detection image of the display panel, and acquiring a gray scale value of each of pixel elements in the first detection image;
   determining the pixel elements of the first detection image having the gray scale value outside a default gray scale range as a first pixel element determining a first communication region constituted by each of the first pixel element of the first detection image, and calculating an aspect ratio of the first communication region; and
   looking up a target parameter matching with the aspect ratio of the first communication region from a pre-built database, and determining a target type corresponding to the target parameter as a type of the display panel.

2. The detecting method according to claim 1, wherein a process of pre-setting the default gray scale range of the detecting device comprises:
   collecting second detection images of a plurality of normal display panels, and acquiring a gray scale value of each of pixel elements of the second detection images; and
   determining the gray scale range constituted by a maximum gray scale value and a minimum gray scale value of the pixel elements of the second detection images as the default gray scale range.

3. The detecting method according to claim 2, wherein the step of collecting the second detection images of the plurality of normal display panels is to collect the second detection images of at least 25 display panels.

4. The detecting method according to claim 1, wherein a process of building the database comprises:
   collecting third detection images of at least 25 display panels having a first type, and acquiring a gray scale value of each of pixel elements of each of the third detection images;
   looking up third pixel elements of the third detection images having the gray scale values outside the default gray scale range, and determining a third communication region constituted by each of the third pixel elements of the third detection images; and
   calculating an aspect ratio of the third communication region in each of the third detection images, determining a parameter range constituted by a maximum aspect ratio and a minimum aspect ratio of the third communication regions in the third detection images, and determining the parameter range as a first parameter corresponding to a first type.

5. The detecting method according to claim 4, wherein the database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

6. The detecting method according to claim 1, wherein a number of the first pixel elements occupying the ratio exceeding 80%.

7. The detecting method according to claim 1, wherein an aspect ratio of the first communication region is a ratio of a maximum number of the pixel elements of the first communication region in a horizontal direction to a maximum number of the pixel elements of the first communication region in a vertical direction.

8. The detecting method according to claim 7, wherein a long side direction of the display panel is corresponding to the vertical direction, and a short side direction of the display panel is corresponding to the horizontal direction.

9. The detecting method according to claim 7, wherein a long side direction of the display panel is corresponding to the horizontal direction, and a short side direction of the display panel is corresponding to the vertical direction.

10. A detecting device for a display panel, comprising:
an image collecting module collecting a first detection image of the display panel, and acquiring a gray scale value of each of pixel elements in the first detection image;
a pixel determining module determining the pixel element of the first detection image having the gray scale value outside a default gray scale range as a first pixel element, determining a first communication region constituted by each of the first pixel elements of the first detection images, and calculating an aspect ratio of the first communication region; and
a type looking module looking up a target parameter matching with the aspect ratio of the first communication region from a pre-built database, and determining a target type corresponding to the target parameter as a type of the display panel.

11. The detecting device according to claim 10, wherein the database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

12. The detecting device according to claim 10, wherein an aspect ratio of the first communication region is a ratio of a maximum number of the pixel elements of the first communication region in a horizontal direction to a maximum number of the pixel elements of the first communication region in a vertical direction.

13. The detecting device according to claim 10, further comprising:
a gray scale presetting module, wherein before the first detection image of the display panel is collected, the gray scale presetting module collects second detection images of a plurality of normal display panels and acquires the gray scale value of each of pixel elements of the second detection images, and determines a gray scale range, constituted by a maximum gray scale value and a minimum gray scale value of the pixel elements of the second detection images, as the default gray scale range.

14. The detecting device according to claim 13, further comprising:
a database building module, wherein before the first detection image of the display panel is collected, the database building module collects third detection images of at least 25 display panels having the first type and acquires a gray scale value of each of pixel elements of each of the third detection images, looks up the third pixel elements of the third detection images having the gray scale values outside the default gray scale range, determines the third communication region constituted by each of the third pixel elements of the third detection images, calculates the aspect ratio of the third communication region in each of the third detection images, and determines the parameter range, constituted by a maximum aspect ratio and a minimum aspect ratio of the third communication regions in the third detection images, as the first parameter corresponding to the first type.

15. The detecting device according to claim 14, wherein the gray scale presetting module and the database building module are integrated into a configuration module.

16. A detecting device for a display panel, comprising:
an image collecting module collecting a first detection image of the display panel, and acquiring a gray scale value of each of pixel elements in the first detection image;
a pixel determining module determining the pixel element of the first detection image having the gray scale value outside a default gray scale range as a first pixel element, determining a first communication region constituted by each of the first pixel elements of the first detection images, and calculating an aspect ratio of the first communication region, wherein an aspect ratio of the first communication region is a ratio of a maximum number of the pixel elements of the first communication region in a horizontal direction to a maximum number of the pixel elements of the first communication region in a vertical direction; and
a type looking module looking up a target parameter matching with the aspect ratio of the first communication region from a pre-built database, and determining a target type corresponding to the target parameter as a type of the display panel, wherein the database at least comprises a horizontal stripe type and a horizontal stripe parameter corresponding to the horizontal stripe type, a vertical stripe type and a vertical stripe parameter corresponding to the vertical stripe type, a rhombus type and a rhombus parameter corresponding to the rhombus type, and a circular type and a circular parameter corresponding to the circular type.

17. The detecting device according to claim 16, further comprising:
a gray scale presetting module, wherein before the first detection image of the display panel is collected, the gray scale presetting module collects second detection images of a plurality of normal display panels and acquires the gray scale value of each of pixel elements of the second detection images, and determines a gray scale range, constituted by a maximum gray scale value and a minimum gray scale value of the pixel elements of the second detection images, as the default gray scale range.

18. The detecting device according to claim 17, further comprising:
a database building module, wherein before the first detection image of the display panel is collected, the database building module collects third detection images of at least 25 display panels having the first type and acquires a gray scale value of each of pixel elements of each of the third detection images, looks up the third pixel elements of the third detection images having the gray scale values outside the default gray scale range, determines the third communication region constituted by each of the third pixel elements of the third detection images, calculates the aspect ratio of the third communication region in each of the third detection images, and determines the parameter range, constituted by a maximum aspect ratio and a minimum aspect ratio of the third communication regions in the third detection images, as the first parameter corresponding to the first type.

19. The detecting device according to claim 18, wherein the gray scale presetting module and the database building module are integrated into a configuration module.

* * * * *